United States Patent
Yamamura et al.

(10) Patent No.: US 7,917,739 B2
(45) Date of Patent: Mar. 29, 2011

(54) STORAGE MEDIUM STORING CALCULATION PROCESSING VISUALIZATION PROGRAM, CALCULATION PROCESSING VISUALIZATION APPARATUS, AND CALCULATION PROCESSING VISUALIZATION METHOD

(75) Inventors: Shuji Yamamura, Kawasaki (JP); Takashi Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 328 days.

(21) Appl. No.: 12/142,499

(22) Filed: Jun. 19, 2008

(65) Prior Publication Data
US 2008/0320289 A1    Dec. 25, 2008

(30) Foreign Application Priority Data
Jun. 25, 2007   (JP) .................... 2007-165823

(51) Int. Cl.
G06F 9/38   (2006.01)
G06F 9/42   (2006.01)
(52) U.S. Cl. ..................... 712/241; 712/227
(58) Field of Classification Search ............... 712/241, 712/227
See application file for complete search history.

(56) References Cited

U.S. PATENT DOCUMENTS

| | | | | |
|---|---|---|---|---|
| 5,564,028 A | * | 10/1996 | Swoboda et al. | 712/227 |
| 6,961,925 B2 | * | 11/2005 | Callahan et al. | 717/128 |
| 7,237,234 B2 | * | 6/2007 | Granston et al. | 717/151 |
| 2008/0155236 A1 | * | 6/2008 | Wilson et al. | 712/241 |

FOREIGN PATENT DOCUMENTS

JP    A 11-65845    3/1999

OTHER PUBLICATIONS

Jack Choquette, et al. "High-Performance Risc Microprocessors," IEEE Micro, pp. 48-55, vol. 19, No. 4, 1999.
Matt Reilly, et al. "Performance Simulation of an Alpha Microprocessor," Computer, pp. 50-58, vol. 31, No. 5, 1998.
"Visual Performance Analyzer," User Guide, Version 4.0, Issue Date: Dec. 15, 2006, http://www.alphaworks.ibm.com/tech/vpa.

* cited by examiner

*Primary Examiner* — Daniel Pan
(74) *Attorney, Agent, or Firm* — Greer, Burns & Crain, Ltd.

(57) ABSTRACT

The execution status of pipeline processing is highly visualized by appropriately displaying processes forming loops in a simplified manner. A loop-information storage unit stores loop-defining information specifying the address of an instruction that causes a pipeline process forming a loop. An operation-information storage unit stores operation information that includes the address of an instruction input into a pipeline and information indicating the execution status of a pipeline process caused by the instruction. A loop determination unit determines whether each pipeline process indicated by the operation information forms a loop by referring to the loop-defining information. An output unit outputs visualization information indicating, in a visually comprehensible manner, the execution status of a pipeline process that has been determined to form a loop for a predetermined number of executions of the loop and the execution status of a pipeline process that has been determined to form no loop.

18 Claims, 14 Drawing Sheets

111 SOURCE CODE

```
int main (int argc, char **argv) {
    int i, a, m;
    a = 0;
    m = 1;

for (i = 1; i <= 3; i++) {
        a = a + i;
        m = m * i;
    }
              :
    return 0;
}
```

121 ASSEMBLY CODE

```
L1:
    mov   0, %g1           ; int a
    mov   1, %g2           ; int m
    mov   1, %g3           ; int i
L2:
    add   %g1, %g3, %g1    ; a = a + i
    mul   %g2, %g3, %g2    ; m = m * i
    add   %g3, 1, %g3      ; i++
    cmp   %g3, 3
    ble   L2
L3:
            ⋮
```

121a = first three mov instructions
121b = L2 block

| LOOP-DEFINING TABLE | | |
|---|---|---|
| LOOP ID | START ADDRESS | END ADDRESS |
| 1 | 0x1000000c | 0x1000001c |
| 2 | 0x10000100 | 0x10000260 |
| 3 | 0x10002010 | 0x10002100 |

| INSTRUC-TION ID | ADDRESS | STAGE COUNT | STAGE 1 | | | STAGE 2 | | | STAGE 3 | | | STAGE 4 | | |
|---|---|---|---|---|---|---|---|---|---|---|---|---|---|---|
| | | | STAGE TYPE | START CLOCK NUMBER | END CLOCK NUMBER | STAGE TYPE | START CLOCK NUMBER | END CLOCK NUMBER | STAGE TYPE | START CLOCK NUMBER | END CLOCK NUMBER | STAGE TYPE | START CLOCK NUMBER | END CLOCK NUMBER |
| 1 | 0x10000000 | 4 | F | 1 | 1 | D | 2 | 2 | X | 3 | 3 | W | 4 | 4 |
| 2 | 0x10000004 | 4 | F | 2 | 2 | D | 3 | 3 | X | 4 | 4 | W | 5 | 5 |
| 3 | 0x10000008 | 4 | F | 3 | 3 | D | 4 | 4 | X | 5 | 5 | W | 6 | 6 |
| 4 | 0x1000000c | 4 | F | 4 | 4 | D | 5 | 5 | X | 6 | 6 | W | 7 | 7 |
| 5 | 0x10000010 | 4 | F | 5 | 5 | D | 6 | 6 | X | 7 | 7 | W | 8 | 8 |
| 6 | 0x10000014 | 4 | F | 6 | 6 | D | 7 | 7 | X | 8 | 8 | W | 9 | 9 |
| 7 | 0x10000018 | 4 | F | 7 | 7 | D | 8 | 8 | X | 9 | 9 | W | 10 | 10 |
| 8 | 0x1000001c | 4 | F | 8 | 8 | D | 9 | 9 | X | 10 | 10 | W | 11 | 11 |
| 9 | 0x1000000c | 4 | F | 9 | 9 | D | 10 | 10 | X | 11 | 11 | W | 12 | 12 |
| 10 | 0x10000010 | 4 | F | 10 | 10 | D | 11 | 11 | X | 12 | 12 | W | 13 | 13 |
| ... | ... | ... | ... | ... | ... | ... | ... | ... | ... | ... | ... | ... | ... | ... |

PIPELINE OPERATION TABLE 161

| LOOP-STATISTICS TABLE 171 | | |
| --- | --- | --- |
| LOOP ID | LOOP COUNT | CPI |
| 1 | 3 | 1 |
| 2 | 10 | 2.5 |
| 3 | 30 | 1.3 |

FIG. 9

PIPELINE OPERATION TABLE 162

| INSTRUC-TION ID | ADDRESS | STAGE COUNT | STAGE 1 ||| STAGE 2 ||| STAGE 3 ||| STAGE 4 |||
|---|---|---|---|---|---|---|---|---|---|---|---|---|---|---|
| | | | STAGE TYPE | START CLOCK NUMBER | END CLOCK NUMBER | STAGE TYPE | START CLOCK NUMBER | END CLOCK NUMBER | STAGE TYPE | START CLOCK NUMBER | END CLOCK NUMBER | STAGE TYPE | START CLOCK NUMBER | END CLOCK NUMBER |
| 1 | 0x10000000 | 4 | F | 1 | 1 | D | 2 | 2 | X | 3 | 3 | W | 4 | 4 |
| 2 | 0x10000004 | 4 | F | 2 | 2 | D | 3 | 3 | X | 4 | 4 | W | 5 | 5 |
| 3 | 0x10000008 | 4 | F | 3 | 3 | D | 4 | 4 | X | 5 | 5 | W | 6 | 6 |
| 4 | 0x1000000c | 4 | F | 4 | 4 | D | 5 | 5 | X | 6 | 9 | W | 10 | 10 |
| 5 | 0x10000010 | 4 | F | 5 | 5 | D | 6 | 6 | X | 7 | 10 | W | 11 | 11 |
| 6 | 0x10000014 | 4 | F | 6 | 6 | D | 7 | 7 | X | 8 | 11 | W | 12 | 12 |
| 7 | 0x10000018 | 4 | F | 7 | 7 | D | 8 | 8 | X | 12 | 12 | W | 13 | 13 |
| 8 | 0x1000001c | 4 | F | 8 | 8 | D | 9 | 9 | X | 13 | 13 | W | 14 | 14 |
| 9 | 0x1000000c | 4 | F | 12 | 12 | D | 13 | 13 | X | 14 | 17 | W | 18 | 18 |
| 10 | 0x10000010 | 4 | F | 13 | 13 | D | 14 | 14 | X | 15 | 18 | W | 19 | 19 |
| ... | ... | ... | ... | ... | ... | ... | ... | ... | ... | ... | ... | ... | ... | ... |

FIG. 12

STORAGE MEDIUM STORING CALCULATION PROCESSING VISUALIZATION PROGRAM, CALCULATION PROCESSING VISUALIZATION APPARATUS, AND CALCULATION PROCESSING VISUALIZATION METHOD

CROSS-REFERENCE TO RELATED APPLICATIONS

This application is based upon and claims the benefits of priority from the prior Japanese Patent Application No. 2007-165823, filed on Jun. 25, 2007, the entire contents of which are incorporated herein by reference.

BACKGROUND OF THE INVENTION

1. Field of the Invention

The present invention relates to a storage medium storing a calculation processing visualization program, a calculation processing visualization apparatus, and a calculation processing visualization method, and particularly relates to a storage medium storing a calculation processing visualization program, a calculation processing visualization apparatus, and a calculation processing visualization method that visualize the execution status of pipeline processing that is executed by a calculation unit.

2. Description of the Related Art

Computers are now required to execute increasingly complicated software and process larger volumes of data. Calculation units incorporated in such computers are required to improve their processing capacity further. To improve the processing capacity, a calculation unit typically employs pipeline processing, which is one technique to speed up calculation processing. The pipeline processing divides processing caused by a single instruction into a plurality of processes (stages) that are executed in parallel.

For example, the processing caused by a single instruction may be divided into four stages: Instruction Fetch (F), Instruction Decode (D), Instruction Execute (X), and Writeback (W). In this case, for example, Instruction Decode (D) of a first instruction may be executed in parallel with Instruction Fetch (F) of a second instruction. This technique substantially enables as many instructions as the number of stages to be executed in parallel, and consequently speeds up calculation processing.

When a calculation unit having a simple pipeline structure is used to process consecutively some instructions dependent on one another, however, a waiting state occurs and processing efficiency lowers. For example, when the second instruction needs the processing result of the first instruction, the second instruction has to wait until the first instruction is completed. Therefore, to develop a calculation unit, a pipeline that would suppress the occurrence of a waiting state should be designed. A complier and programs intended for the calculation unit with pipeline processing also need be developed so as to fit the pipeline structure of the calculation unit.

Developers of calculation units, compliers, and programs simulate pipeline processing as required to analyze the occurrence of a waiting state. For example, a simulator intended for pipeline processing receives the design information and a test program of a target calculation unit, virtually executes the test program, and outputs information indicating the execution status of pipeline processing.

Simulation results obtained in this way are displayed in a visual format easily comprehensible to the developer. One such format known in the art is a waterfall chart showing the stage changes of each pipeline stage in tabular form, in which the vertical axis indicates instructions input into the pipeline and the horizontal axis indicates clock cycles. With one conventional visualization method using such a waterfall chart, a portion where a waiting state occurs is highlighted (refer to Unexamined Japanese Patent Application Publication No. Hei-11-65845, for example).

However, with the technique described in Unexamined Japanese Patent Application Publication No. Hei-11-65845, developers may have difficulties in finding problematic portions that can lower processing efficiency when the developers are required to handle large volumes of simulation-result data. In particular, developers will have more difficulties in finding problematic portions when the test program includes instructions that cause processes forming loops. When the test program includes such instructions, the waterfall chart displays an element indicating an identical process forming each loop the number of times the loop is executed. The execution status of only one or a small number of processes forming the same loop would actually be sufficient for the developers to check problematic portions that can lower processing efficiency. However, the developers may fail to correctly determine each loop simply by comparing in shape elements indicating processes in the waterfall chart.

SUMMARY OF THE INVENTION

In view of the foregoing, it is an object of the present invention to provide a storage medium storing a calculation processing visualization program, a calculation processing visualization apparatus, and a calculation processing visualization method that visualize the execution status of pipeline processing by displaying a loop portion in an appropriately simplified manner.

To accomplish the above object, according to the present invention, there is provided a storage medium having stored thereon a calculation processing visualization program for visualizing execution status of pipeline processing that is executed by a calculation unit. The program makes a computer function as a loop-information storage unit for storing loop-defining information specifying an address of an instruction that causes a pipeline process forming a loop, among a plurality of instructions included in a test program that undergoes testing; an operation-information storage unit for storing operation information that includes an address of an instruction that is input into a pipeline when the test program is executed and information indicating execution status of a pipeline process caused by the instruction; a loop determination unit for determining whether each pipeline process indicated by the operation information stored in the operation-information storage unit forms a loop by referring to the loop-defining information stored in the loop-information storage unit; and an output unit for outputting visualization information indicating, in a visually comprehensible manner, execution status of a pipeline process that has been determined to form a loop by the loop determination unit for a predetermined number of executions of the loop and execution status of a pipeline process that has been determined to form no loop by the loop determination unit.

To accomplish the above object, according to the present invention, there is also provided a calculation processing visualization apparatus for visualizing execution status of pipeline processing that is executed by a calculation unit. The calculation processing visualization apparatus includes a loop-information storage unit for storing loop-defining information specifying an address of an instruction that causes a pipeline process forming a loop, among a plurality of instructions included in a test program that undergoes testing; an operation-information storage unit for storing operation information that includes an address of an instruction that is input into a pipeline when the test program is executed and information indicating execution status of a pipeline process caused by the instruction; a loop determination unit for determining whether each pipeline process indicated by the operation information stored in the operation-information storage unit forms a loop by referring to the loop-defining information stored in the loop-information storage unit; and an output unit for outputting visualization information indicating, in a visually comprehensible manner, execution status of a pipeline process that has been determined to form a loop by the loop determination unit for a predetermined number of executions of the loop and execution status of a pipeline process that has been determined to form no loop by the loop determination unit.

To accomplish the above object, according to the present invention, there is further provided a calculation processing visualization method for visualizing execution status of pipeline processing that is executed by a calculation unit. The calculation processing visualization method includes the steps of a loop determination unit obtaining, from an operation-information storage unit, operation information that includes an address of an instruction that is input into a pipeline when a test program that undergoes testing is executed and information indicating execution status of a pipeline process caused by the instruction, and determining whether each pipeline process indicated by the operation information forms a loop by referring to loop-defining information stored in a loop-information storage unit, the loop-defining information specifying an address of an instruction that causes a pipeline process forming a loop, among a plurality of instructions included in the test program; and an output unit outputting visualization information indicating, in a visually comprehensible manner, execution status of a pipeline process that has been determined to form a loop by the loop determination unit for a predetermined number of executions of the loop and execution status of a pipeline process that has been determined to form no loop by the loop determination unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows an example source code of an evaluation-target program.

FIG. 5 shows an example assembly code of the evaluation-target program.

FIG. 6 shows the data structure of a loop-defining table.

FIG. 7 shows the data structure of a pipeline operation table.

FIG. 9 shows the data structure of a loop-statistics table.

FIG. 12 shows a pipeline operation table of another example.

DESCRIPTION OF THE PREFERRED EMBODIMENTS

An embodiment of the present invention will be described below with reference to the drawings. An overview of present invention will be described first and then the embodiment of the present invention will be described in detail.

Figure 1:
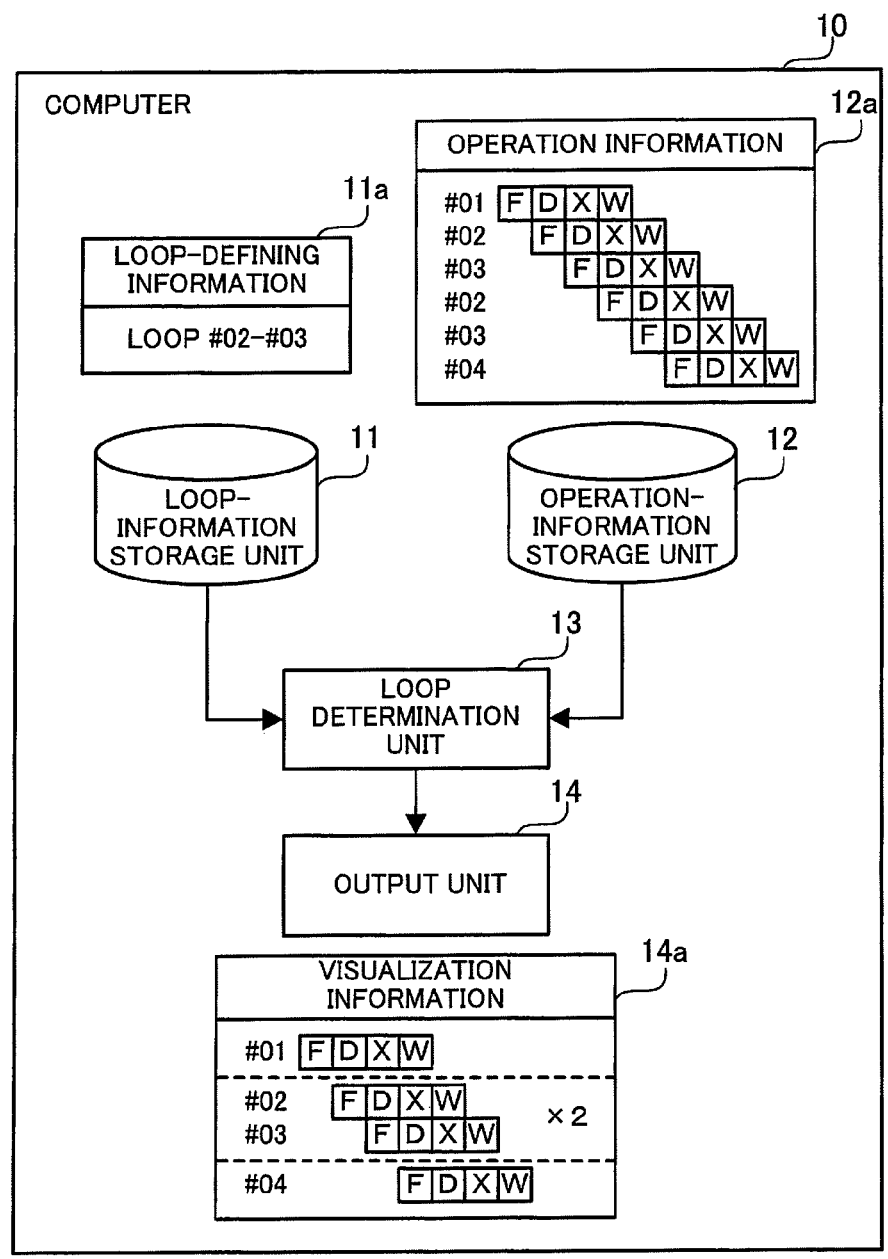
FIG. 1 shows an overview of the present invention.

FIG. 1 shows an overview of the present invention. A computer 10 shown in FIG. 1 visualizes the execution status of pipeline processing that is executed by a calculation unit. The computer 10 includes a loop-information storage unit 11, an operation-information storage unit 12, a loop determination unit 13, and an output unit 14.

The loop-information storage unit 11 stores loop-defining information 11a. The loop-defining information 11a specifies the addresses of instructions that cause processes forming loops, among a plurality of instructions included in a test program that undergoes testing. For example, the loop-defining information 11a specifies a start address and an end address of each loop to define the range of addresses of instructions that cause processes forming the loop. The loop-defining information 11a can be extracted from intermediate information that is generated by a complier during compiling of the source code of the test program.

The operation-information storage unit 12 stores operation information 12a. The operation information 12a includes the addresses of instructions that are input into a pipeline when the test program is executed and information indicating the execution status of pipeline processes caused by the instructions input into the pipeline. The information indicating the execution status of each pipeline process may, for example, associate each pipeline stage with a clock cycle. For example, the operation information 12a is obtained as a simulation result when a simulator of the calculation unit simulates pipeline processing of the input test program.

The loop determination unit 13 obtains the loop-defining information 11a stored in the loop-information storage unit 11 and the operation information 12a stored in the operation-information storage unit 12. The loop determination unit 13 compares the addresses of the instructions input into the pipeline indicated by the operation information 12a with the addresses indicated by the loop-defining information 11a to determine whether pipeline processes caused by the instructions form loops.

The output unit 14 generates visualization information 14a which indicates the execution status of the pipeline processes indicated by the operation information 12a, in a visually comprehensible manner, based on the determination result of the loop determination unit 13, and outputs the visualization information 14a. More specifically, the output unit 14 visualizes each pipeline process that has been determined to form no loop. The output unit 14 visualizes each pipeline process that has been determined to form a loop only for a predetermined number of executions of the loop. The output visualization information 14a may be displayed on a predetermined monitor, or may be stored in a predetermined storage device for subsequent use.

The test program is assumed to include instructions #02 and #03 which cause pipeline processes forming a loop. In addition, it is assumed in simulation for the test program that instructions #01, #02, #03, #02, #03, and #04 are sequentially input into the pipeline in that order. Based on the addresses of the instructions, it is understood that the instructions #02 and #03 cause pipeline processes forming a loop and that the loop has been executed twice. For example, the pipeline processes caused by the instructions #02 and #03 are displayed only for the first execution of the loop to provide a simplified indication.

The computer 10 executes a calculation processing visualization program that performs the above-described processing. In this computer 10, the loop determination unit 13 determines whether each pipeline process indicated by the operation information 12a forms a loop by referring to the loop-defining information 11a, which specifies the addresses of instructions that cause pipeline processes forming a loop. The output unit 14 outputs the visualization information 14a, which indicates, in a visually comprehensible manner, the execution status of each pipeline process that has been determined to form a loop for a predetermined number of executions of the loop and the execution status of each pipeline process that has been determined to form no loop.

This allows loop portions of the pipeline processing to be displayed in an appropriately simplified manner and improves the visible comprehension of the pipeline processing, thereby allowing the execution status of the pipeline processing to be analyzed more easily.

The embodiment of the present invention will now be described in detail with reference to the drawings. A simulation apparatus 100 according to the embodiment of the present invention simulates pipeline processing that is executed by a calculation unit. The simulation apparatus according to the embodiment may be formed, for example, by a computer executing a predetermined simulation program.

Figure 2:
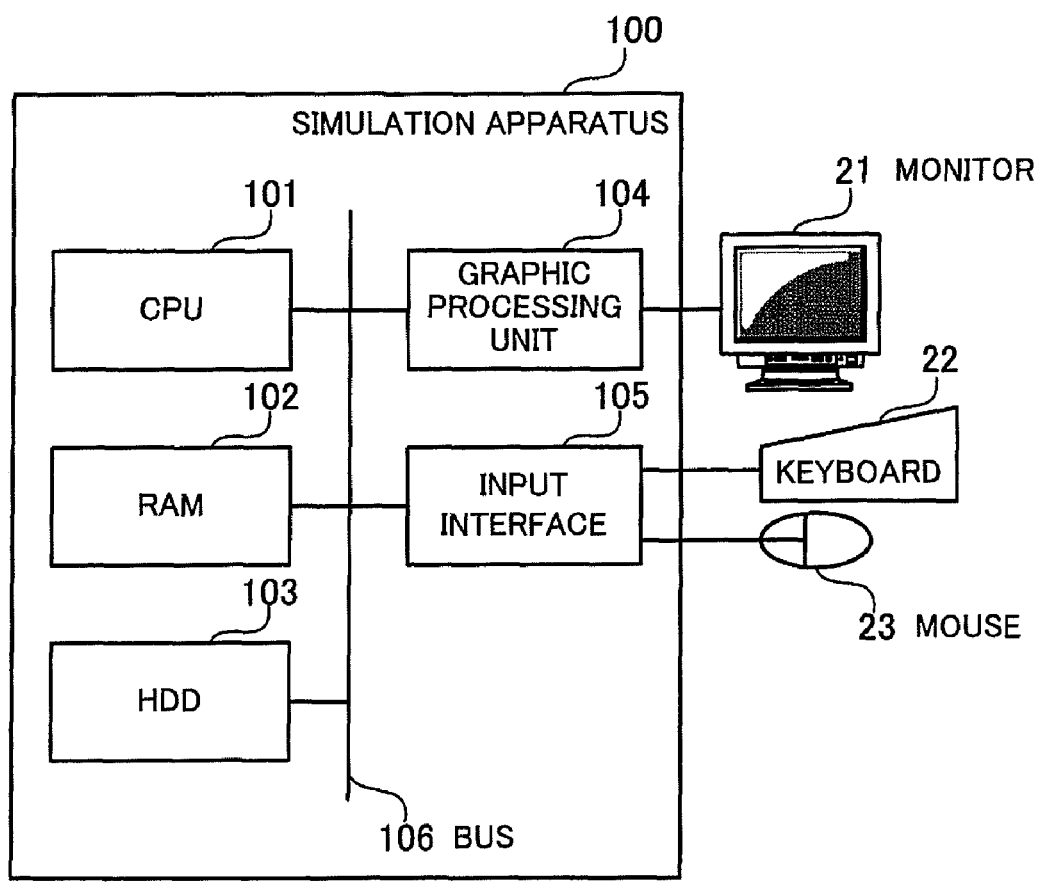
FIG. 2 shows the hardware structure of a simulation apparatus according to an embodiment of the present invention.

FIG. 2 shows the hardware structure of the simulation apparatus 100. The simulation apparatus 100 includes a central processing unit (CPU) 101, which controls the overall operation of the simulation apparatus 100. The simulation apparatus 100 further includes a random access memory (RAM) 102, a hard disk drive (HDD) 103, a graphic processing unit 104, and an input interface 105, which are connected to the CPU 101 via a bus 106.

The RAM 102 temporarily stores at least a part of an operating system (OS) program and an application program, which are executed by the CPU 101. The RAM 102 temporarily stores at least a part of data used by the CPU 101 when the CPU 101 performs processing. The HDD 103 stores the OS program and the application program. The HDD 103 stores data used by the CPU 101 when the CPU 101 executes processing.

A monitor 21 is connected to the graphic processing unit 104. The graphic processing unit 104 displays an image on a screen of the monitor 21 in accordance with an instruction from the CPU 101. A keyboard 22 and a mouse 23 are connected to the input interface 105. The input interface 105 receives a signal transmitted from the keyboard 22 or the mouse 23 and transmits the signal to the CPU 101 via the bus 106.

The functions of the embodiment of the present invention are enabled by the hardware structure described above.

The module structure of the simulation apparatus 100 will now be described.

Figure 3:
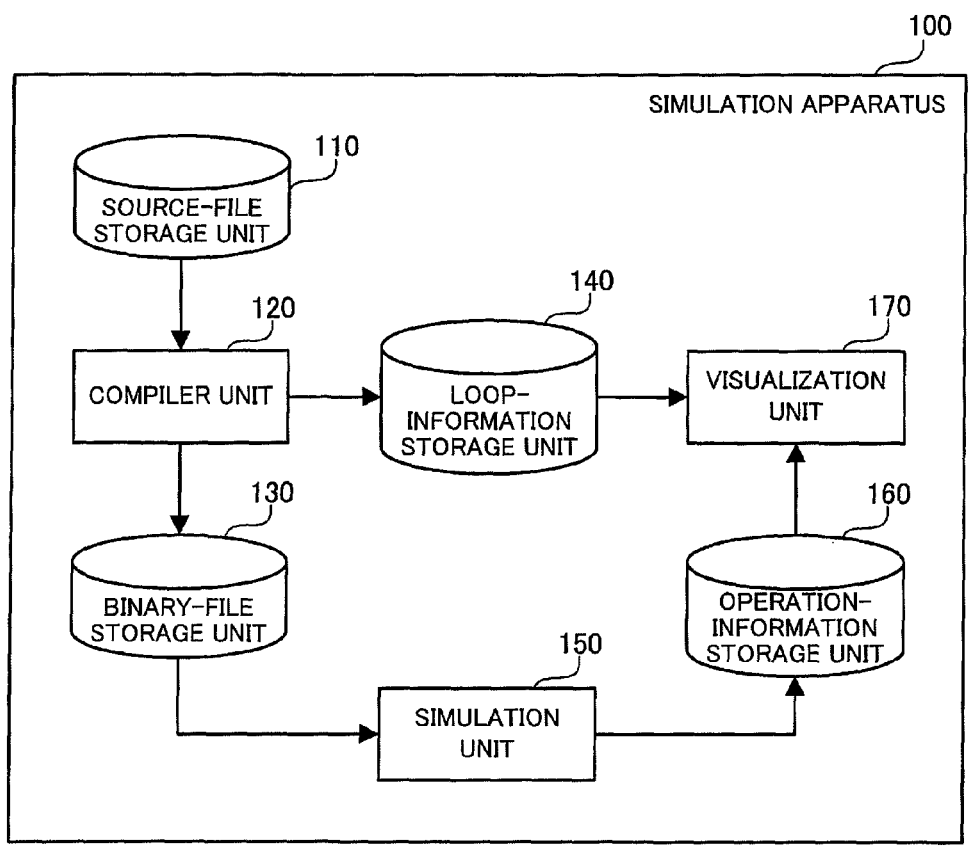
FIG. 3 is a block diagram showing the functions of the simulation apparatus.

FIG. 3 is a block diagram showing the functions of the simulation apparatus 100. The simulation apparatus 100 includes a source-file storage unit 110, a complier unit 120, a binary-file storage unit 130, a loop-information storage unit 140, a simulation unit 150, an operation-information storage unit 160, and a visualization unit 170.

The source-file storage unit 110 stores a source file storing the source code of a simulation-target program that undergoes simulation. The user of the simulation apparatus 100 is required to create a source file in advance and store the source file in the source-file storage unit 110.

When the user inputs an instruction to compile the source file, the compiler unit 120 reads the source file from the source-file storage unit 110. The compiler unit 120 complies the source code to generate executable binary code. The complier unit 120 has a so-called cross compiling function and can generate binary code executable by a simulation-target calculation unit that undergoes simulation. The compiler unit 120 generates information during its compiling process, and outputs, among the information, loop-defining information that the specifies the addresses of instructions that cause pipeline processes forming loops.

The binary-file storage unit 130 stores a binary file storing the binary code generated by the compiler unit 120. The binary file is an executable program file, and stores one or more instructions executable by the simulation-target calculation unit.

The loop-information storage unit 140 stores the loop-defining information output by the complier unit 120. The loop-defining information indicates the addresses of instructions corresponding to the start and the end of each loop defined in the simulation-target program.

When the user inputs an instruction to start simulation, the simulation unit 150 reads the binary file of the simulation-target program from the binary-file storage unit 130. The simulation unit 150 then simulates calculation processing based on the read binary file and design information of the predetermined calculation unit. The user is required to create the design information of the calculation unit in advance and store the design information in the simulation unit 150. The user may select one of a plurality of pieces of design information provided, when instructing to start simulation.

The operation-information storage unit 160 stores operation information output from the simulation unit 150 as a simulation result. The operation information indicates, for each instruction input into the pipeline of the calculation unit, the progress of a pipeline process, more specifically, the clock cycles during which each stage in the pipeline process has been executed.

When the simulation unit 150 completes simulation of the calculation processing, the visualization unit 170 reads the operation information from the operation-information storage unit 160 and also reads the loop-defining information from the loop-information storage unit 140. Then, the visualization unit 170 generates a waterfall chart that visualizes the execution state of the pipeline processing based on the read operation information and loop-defining information and displays the waterfall chart on the monitor 21. The waterfall chart shows the progress of each pipeline process in tabular form with its vertical axis indicating instructions input into the pipeline and its horizontal axis indicating clock cycles.

FIG. 4 shows an example source code 111 of an evaluation-target program that undergoes evaluation. The source code 111 shown in FIG. 4 is stored in a source file in the source-file storage unit 110. The source code 111 represents the simulation-target program written in the C language. The source code 111 includes a code range 111a and a code range 111b. The code range 111a declares variables a, m, and i, which are used in the program, and initializes the variables a and m. The code range 111*b* specifies arithmetic operations performed using the variables declared in the code range 111*a*. In the present embodiment, the code range 111*b* specifies two arithmetic operations that are repeated three times in a loop.

FIG. 5 shows an example assembly code 121 of the evaluation-target program. The assembly code 121 shown in FIG. 5 is generated by the compiler unit 120 during the compiling process. The assembly code 121 represents the processing corresponding to the source code 111 in a predetermined assembly language. The assembly code includes a code range 121*a* corresponding to the code range 111*a* of the sources 111, and a code range 121*b* corresponding to the code range 111*b* of the source code 111.

The code range 121*a* consists of three instructions that are written between labels L1 and L2. More specifically, the code range 121*a* consists of three instructions that assign initial values to the variables a, m, and i. The code range 121*b* consists of five instructions that are written between labels L2 and L3. More specifically, the code range 121*b* consists of an addition instruction using the variable a, a multiplication instruction using the variable m, and an addition instruction using the variable i, which indicates a loop counter, a comparison instruction of the loop counter, and a branch instruction that uses a comparison result of the loop counter. The comparison instruction and the branch instruction cause processes forming a loop in which the five instructions are executed three times.

FIG. 6 shows the data structure of a loop-defining table 141. The loop-defining table 141 shown in FIG. 6 is generated by the compiler unit 120, and is stored in the loop-information storage unit 140. The loop-defining table 141 includes a loop ID field, a start address field, and an end address field. Values for these fields arranged in a row are associated with one another to form one set of loop-defining information, which corresponds to a single loop.

The loop ID field shows an identification number that uniquely identifies each loop included in the simulation-target program. Serial numbers starting at one are used as the identification numbers. The start address field shows the address of an instruction corresponding to the start of each loop. For example, the address of the fourth instruction (addition instruction) included in the assembly code 121 shown in FIG. 5 corresponds to a start address. The end address field shows the address of an instruction corresponding to the end of each loop. For example, the eighth instruction (branch instruction) included in the assembly code 121 shown in FIG. 5 corresponds to an end address.

The start and end addresses are numerical values in bytes indicating the positions from the top of the data in the binary file. In the example shown in FIG. 6, hexadecimal numbers are used as the start and end addresses. The complier unit 120 extracts the loop-defining information in the compiling process and stores the extracted information in the loop-defining table 141.

FIG. 7 shows the data structure of a pipeline operation table 161. The pipeline operation table 161 shown in FIG. 7 is stored in the operation-information storage unit 160. The pipeline operation table 161 includes an instruction ID field, an address field, and a stage count field. The pipeline operation table 161 further includes a stage type field, a start clock field, and an end clock field. Values for these fields that are arranged in a row are associated with one another to form one set of operation information, which corresponds to a single execution of an instruction.

The instruction ID field shows an identification number that uniquely identifies each pipeline process. Serial numbers starting at one are used as the identification numbers. A new identification number is assigned to a pipeline process every time an instruction is newly input into the pipeline. The address field shows the address of each instruction input into the pipeline. The addresses are numerical values indicating the positions from the top of the data in the binary file. The stage count field shows the number of stages that have been executed in the pipeline process.

The stage type field shows a symbol denoting each stage. For example, F denotes Instruction Fetch, D denotes Instruction Decode, X denotes Instruction Execute, M denotes Memory Access, and W denotes Write-back. The start clock field shows the clock cycle at which the process of each stage has started. The end clock field shows the clock cycle at which the process of each stage has ended. Sets of values for the stage type field, the start clock field, and the end clock field are specified the same number of times as that of stages that have been executed.

The operation information is stored in the pipeline operation table 161 by the simulation unit 150. For example, a set of information is stored which includes an instruction ID of 4; an address of 0x1000000c; a stage count of 4; an stage type of F of the stage corresponding to an clock cycle of 4; a stage type of D of the stage corresponding to an clock cycle of 5; a stage type of X of the stage corresponding to an clock cycle of 6; and a stage type W of the stage corresponding to a clock cycle of 7.

In the example shown in FIG. 7, the sets of the operation information identified by instruction IDs of 4 to 8 correspond to the first execution of the loop shown in FIG. 5. The set of the operation information identified by an instruction ID of 9 corresponds to the start of the second execution of the loop after the first execution of the loop has been completed and the processing has returned to the start of the loop.

Visualization processing performed by the simulation apparatus 100 based on the loop-defining information and the operation information will now be described in detail.

Figure 8:
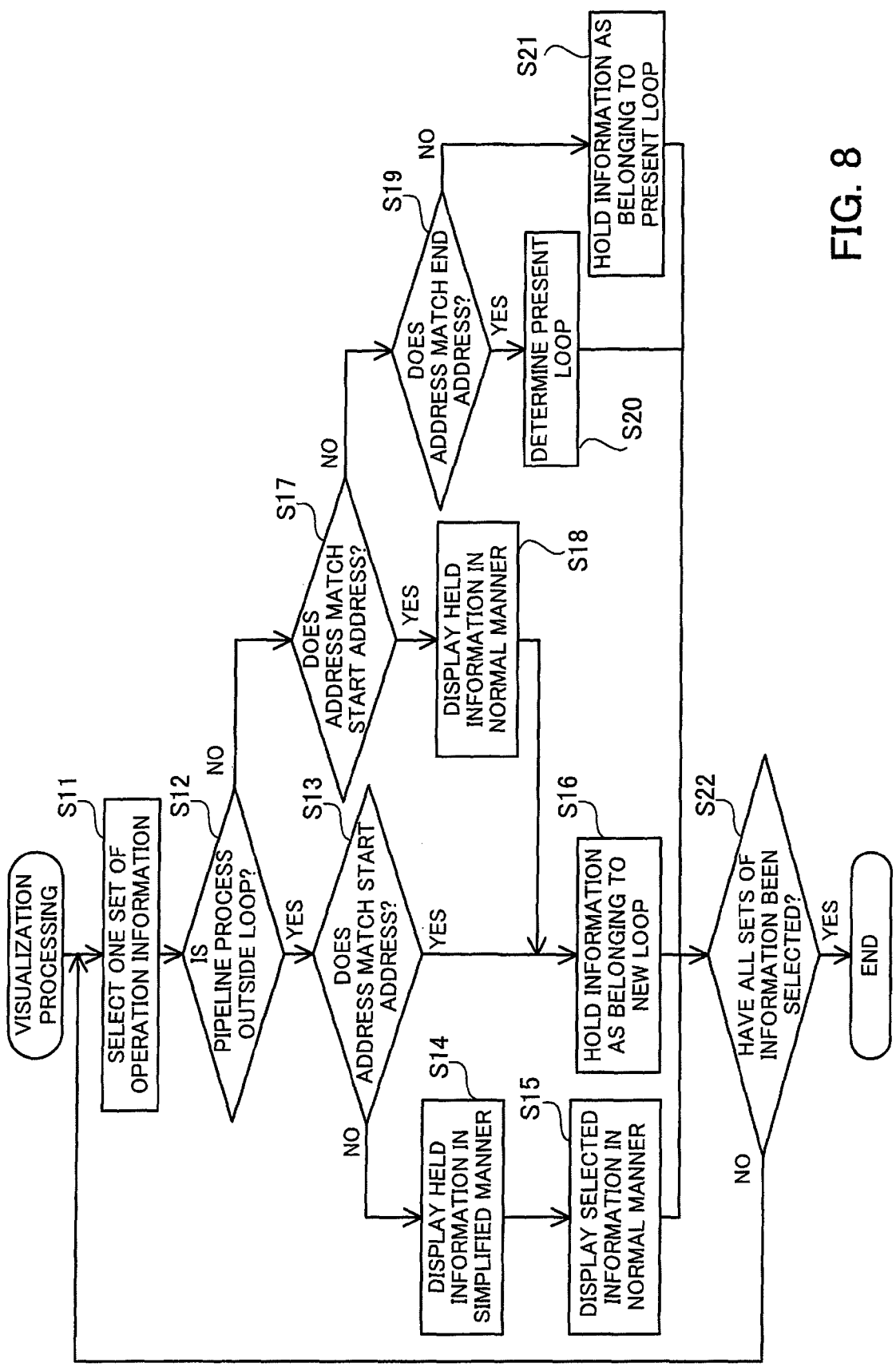
FIG. 8 is a flowchart illustrating a procedure of visualization processing.

FIG. 8 is a flowchart illustrating a procedure of the visualization processing. The visualization processing will now be described by following the steps shown in FIG. 8.

Step S11: The visualization unit 170 selects one set of operation information from the pipeline operation table 161 stored in the operation-information storage unit 160 in the ascending order of values of the instruction IDs.

Step S12: The visualization unit 170 determines whether a loop flag is off, that is, whether the pipeline process is outside a loop. The loop flag indicates whether the pipeline process forms a loop. The loop flag is off (the pipeline process is outside a loop) when the visualization processing has just been started. When the pipeline process is outside a loop, the processing advances to step S13. When the pipeline process is inside a loop, the processing advances to step S17.

Step S13: The visualization unit 170 determines whether the address indicated by the set of operation information selected in step S11 matches the start address of any loop by referring to the loop-defining table 141 stored in the loop-information storage unit 140. When the address matches the start address of one loop, the processing advances to step S16. When the address does not match the start address of any loop, the processing advances to step S14.

Step S14: The visualization unit 170 displays the pipeline process indicated by the set of operation information held temporarily, onto the monitor 21 in a simplified manner. More specifically, the visualization unit 170 displays only pipeline processes corresponding to the first execution of each loop onto the monitor 21, and does not display pipeline processes corresponding to the second and subsequent executions of each loop. Also, the visualization unit 170 statistically processes sets of operation information corresponding to all repeated executions of the same loop, and displays a resulting statistical value on the monitor 21. The visualization unit 170 then deletes the set of operation information held temporarily.

Step S15: The visualization unit 170 displays the pipeline process indicated by the set of operation information selected in step S11 on the monitor 21 in a normal manner.

Step S16: The visualization unit 170 temporarily holds the set of operation information selected in step S11 as operation information that belongs to a new loop. The visualization unit 170 then sets the loop flag on (indicating that the pipeline process is inside a loop).

Step S17: The visualization unit 170 determines whether the address indicated by the set of operation information selected in step S11 matches the start address of any loop by referring to the loop-defining table 141. When the address matches the start address of one loop, the processing advances to step S18. When the address does not match the start address of any loop, the processing advances to step S19.

Step S18: The visualization unit 170 displays all pipeline processes indicated by the sets of operation information held temporarily, onto the monitor 21 in a normal manner. The visualization unit 170 then deletes the sets of operation information held temporarily.

Step S19: The visualization unit 170 determines whether the address indicated by the set of operation information selected in step S11 matches the end address of any loop by referring to the loop-defining table 141. When the address matches the end address of one loop, the processing advances to step S20. When the address does not match the end address of any loop, the processing advances to step S21.

Step S20: The visualization unit 170 temporarily holds the set of operation information selected in step S11 as operation information that belongs to the same loop as the set of operation information selected immediately before. The visualization process 170 sets the loop flag off.

Step S21: The visualization unit 170 temporarily holds the set of operation information selected in step S11 as operation information that belongs to the same loop as the set of operation information selected immediately before.

Step S22: The visualization unit 170 determines whether all sets of operation information have been selected in step S11. When all sets of operation information have been selected, the processing ends. When any set of the operation information has yet to be selected, the processing returns to step S11.

As described above, the visualization unit 170 determines whether the pipeline processes indicated by each set of operation information forms a loop based on the address of each instruction input into the pipeline. Based on the sets of operation information, the visualization unit 170 displays the pipeline processes corresponding to only the first execution of each loop, whereas the visualization unit 170 displays all pipeline processes that form no loops. The visualization unit 170 statistically processes sets of operation information corresponding to all repeated executions of the same loop, and displays the resulting statistical value together with the execution status of the pipeline processes.

In the visualization processing shown in FIG. 8, only the innermost loop among multiple loops is displayed in a simplified manner. However, loops other than the innermost loop may be displayed in a simplified manner in accordance with the hierarchy of each loop.

FIG. 9 shows the data structure of a loop-statistics table 171. The loop-statistics table 171 shown in FIG. 9 is generated by the visualization unit 170 in the visualization processing. The loop-statistics table 171 includes a loop ID field, a loop count field, and a cycles per instruction (CPI) field. Values for these fields arranged in a row are associated with one another to form one set of loop-statistics information, which corresponds to each loop.

The loop ID field shows an identification number that uniquely identifies each loop included in the simulation-target program. The loop ID corresponds to the loop ID included in the loop-defining table 141 shown in FIG. 6. The loop count field shows the number of times each loop has been executed during simulation.

The CPI field shows the number of cycles required per instruction during the loop. More specifically, the CPI is an average number of clock cycles required per instruction. In an ideal execution status, one instruction is input into the pipeline during one clock cycle without any waiting state. In this case, the CPI is 1. When a waiting state occurs, the CPI would be greater than 1.

Information stored in the loop-statistics table 171 is generated and held by the visualization unit 170. For example, a loop ID of 2, a loop count of 10, and a CPI of 2.5 are held.

Figure 10:
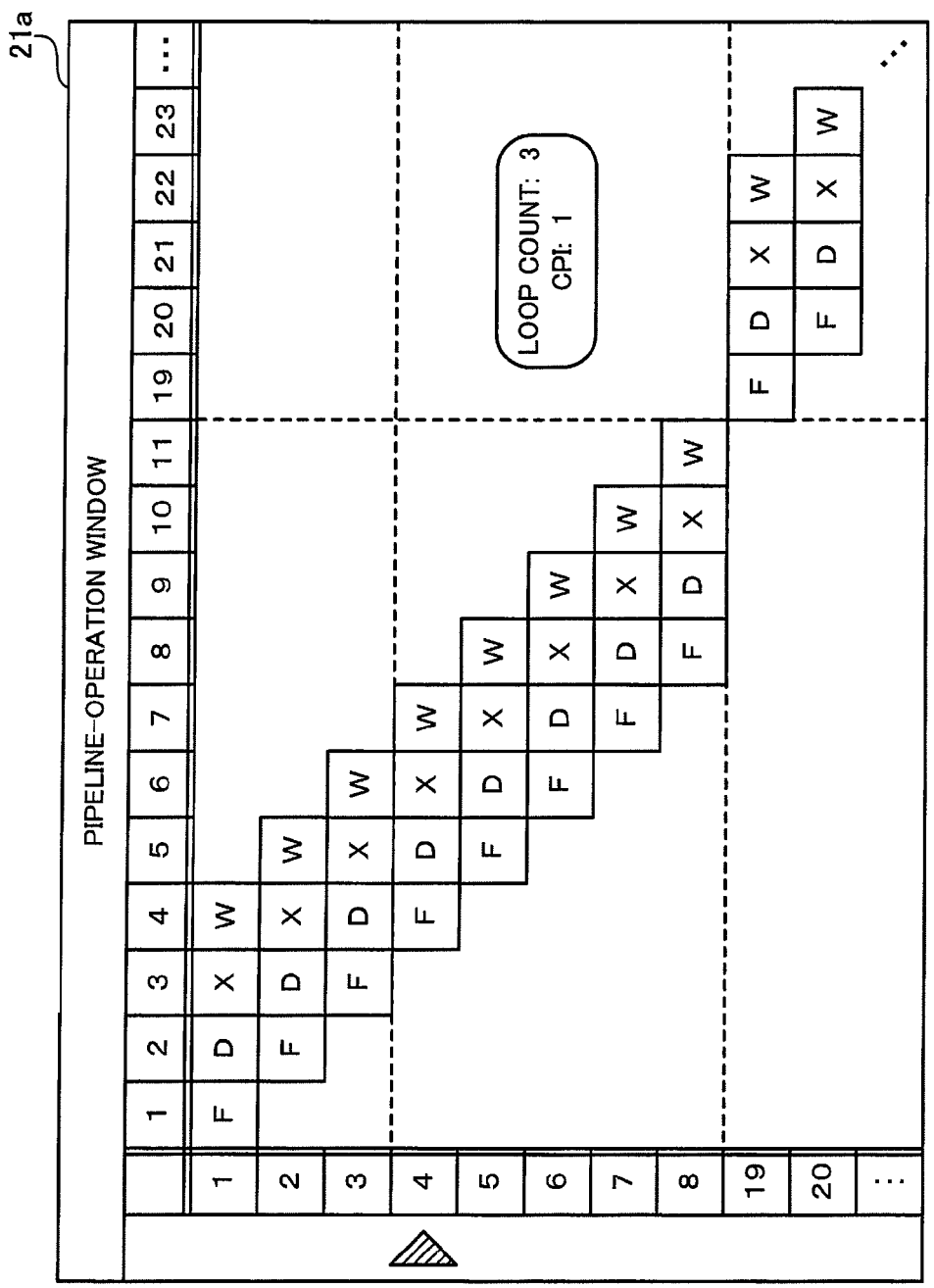
FIG. 10 shows a pipeline-operation window of a first example.

FIG. 10 shows a pipeline-operation window 21a of a first example. The pipeline-operation window 21a shown in FIG. 10 is displayed on the monitor 21 by the visualization unit 170 and shows a waterfall chart indicating simulation results of calculation processing in a visually comprehensible manner.

The vertical axis of the waterfall chart indicates instructions input into the pipeline, whereas the horizontal axis indicates clock cycles. The data in the waterfall chart basically corresponds to the data stored in the pipeline operation table 161 of FIG. 7. More specifically, the waterfall chart associates the progress of each instruction input into the pipeline with the clock cycle in a visually comprehensible manner.

The pipeline-operation window 21a displays loop portions of the calculation processing in a simplified manner. The loop portions are enclosed by dotted lines to separate the loop portions from the other portions. Only the execution status of the first execution of each loop portion is shown. Following the execution status of one loop, the execution status of a subsequent process is shown. The loop count and the CPI are displayed near the execution status of each loop portion.

The user can move a triangle mark on the left of the chart to display the execution status of a desired loop portion.

Figure 11:
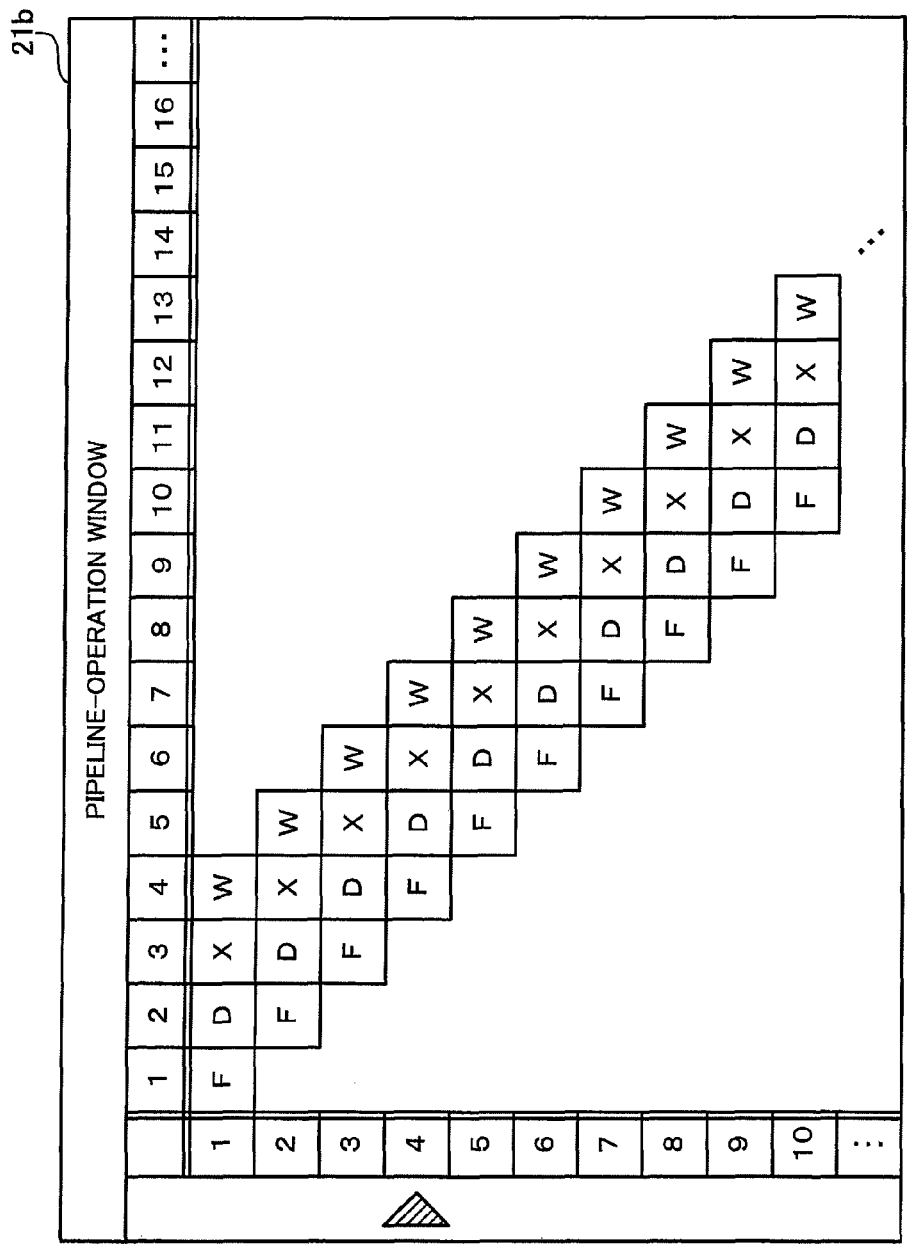
FIG. 11 shows a pipeline-operation window of a second example.

FIG. 11 shows a pipeline-operation window 21b of a second example. The pipeline-operation window 21b of FIG. 11 is displayed on the monitor 21 by the visualization unit 170 when the user performs an operation input on the pipeline-operation window 21a. As shown in FIG. 11, the pipeline-operation window 21b displays the execution status of all pipeline processes. The user can operate a triangle mark on the left of the pipeline-operation window 21b to return to the pipeline-operation window 21a. In other words, the user can switch the display of the loop portions as necessary.

In the examples shown in FIGS. 10 and 11, the CPI is 1. In other words, the examples shown in FIGS. 10 and 11 show the execution status of ideal pipeline processing that involves no waiting states. Examples of pipeline processing that involves waiting states will be described below.

FIG. 12 shows a pipeline-operation table 162 of another example. The pipeline operation table 162 shown in FIG. 12 is stored in the operation-information storage unit 160. The data structure of the pipeline operation table 162 is identical to the data structure of the pipeline operation table 161 shown in FIG. 7.

The pipeline operation table 162 differs from the pipeline operation table 161 in the number of clock cycles required by Instruction Execute (X) stages of some instructions. More specifically, in the pipeline operation table 162, Instruction Execute (X) stages of three instructions with addresses 0x1000000c to 0x10000014 each require four clock cycles. For example, the Instruction Execute (X) stage of the pipeline process with an instruction ID of 4 is executed from clock cycle number 6 to 9.

Figure 13:
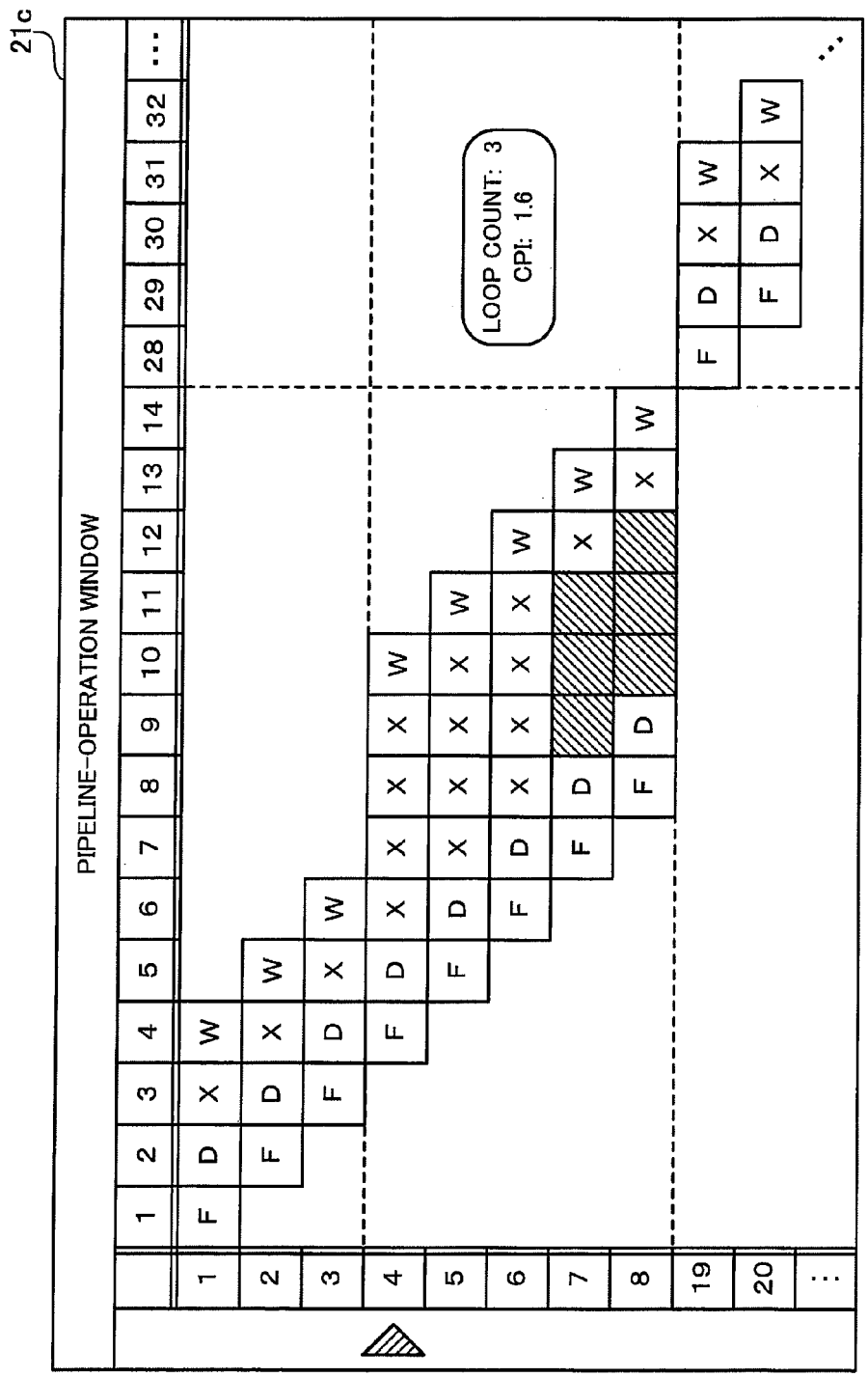
FIG. 13 shows a pipeline-operation window of a third example.

FIG. 13 shows a pipeline-operation window 21c of a third example. The pipeline-operation window 21c of FIG. 13 is displayed on the monitor 21 by the visualization unit 170. In this example, Instruction Execute (X) stages of the pipeline processes with instruction IDs of 4 to 6 each require four clock cycles. Therefore, four blocks with symbol X are displayed consecutively. The stages of the pipeline processes with instruction IDs of 7 and 8 each require one clock cycle as in the pipeline processes shown in FIG. 10. However, since the pipeline process with an instruction ID of 7 uses an execution result of the pipeline process with an instruction ID of 6, a waiting state occurs. The pipeline-operation window 21c highlights such waiting states by using shaded blocks.

When the pipeline process of one stage requires a plurality of clock cycles or when a waiting state continues for a plurality of clock cycles, as many blocks as the plurality of clock cycles are arranged in the horizontal direction in this type of display method. If the process of one stage requires tens to hundreds of clock cycles or a waiting state continues for tens to hundreds of clock cycles, as in memory access, the waterfall chart would provide low visible comprehension. To prevent this, a display method that simplifies indication also in the direction of the clock cycles can be used.

Figure 14:
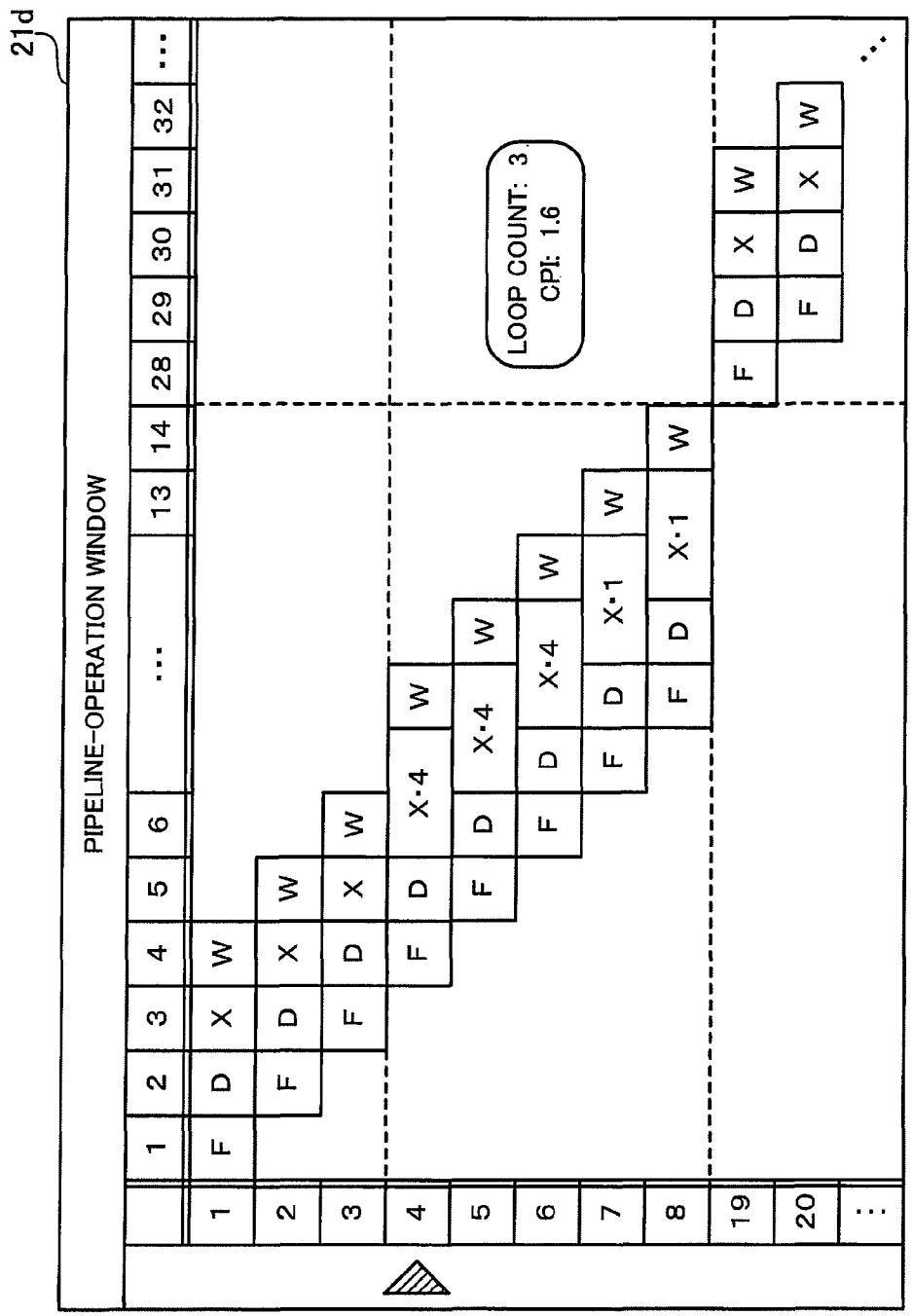
FIG. 14 shows a pipeline-operation window of a fourth example.

FIG. 14 shows a pipeline-operation window 21d of a fourth example. The pipeline-operation window 21d shown in FIG. 14 is displayed on the monitor 21 by the visualization unit 170 and shows the same data as in the pipeline-operation window 21c shown in FIG. 13 in a different manner.

More specifically, an Instruction Execute (X) stage requiring consecutive four clock cycles is not displayed using four blocks but is displayed by a simplified indication using a symbol denoting the stage and the number of clock cycles required. When this type of display method is used, it is necessary to determine in advance a threshold for the number of consecutive clock cycles for which the simplified indication is used. For example, the threshold is set to three. In this case, the pipeline process is displayed by the simplified indication when the process requires three or more consecutive clock cycles.

The length of a portion displayed by the simplified indication needs to be appropriately specified to prevent the relative positions of the start and end clock cycles of a plurality of pipeline processes from changing. In the example of FIG. 14, the length of the portion indicating the Instruction Execute (X) stage forming the loop is uniformly set to the length of two blocks.

Although the present embodiment describes the case in which the execution status of the pipeline processes corresponding to the first execution of each loop is displayed, the execution status of any execution of the loop, such as the last execution of the loop, may be displayed instead. Although the present embodiment describes the case in which the execution status of only a single execution of each loop is displayed, the execution status of a predetermined number of executions of the loop, such as two or three executions of the loop, may be displayed instead.

The simulation apparatus 100 allows loop portions to be displayed in an appropriately simplified manner in the direction of instructions. Moreover, the simulation apparatus 100 allows pipeline processes each requiring a plurality of clock cycles or waiting states each over a plurality of clock cycles to be displayed in an appropriately simplified manner in the direction of clock cycles. In other words, the simulation apparatus 100 appropriately eliminates portions unimportant to the analysis of pipeline processing to improve the visible comprehension of the waterfall chart. As a result, the simulation apparatus 100 makes the analysis of the pipeline processing more easily.

In particular, since the simulation apparatus 100 determines whether each pipeline process forms a loop based on information about the address of an instruction obtained, for example, from the complier, a loop determination error is prevented unlike a case where a loop determination is made according to comparison in shape of elements indicating pipeline processes.

The functions described above can be realized by a computer executing a program representing the processing of the functions of the simulation apparatus 100. The program may be stored in computer-readable recording media. The computer-readable recording media include magnetic recording devices, optical discs, magneto-optical recording media, and semiconductor memories. The magnetic recording devices include hard disc drives (HDDs), flexible disks (FDs), and magnetic tape (MT). The optical discs include digital versatile discs (DVDs), DVD-RAMs, compact disc read only memories (CD-ROMs), CD recordables (CD-Rs), and CD-rewritables (CD-RWs). The magneto-optical recording media include magneto-optical disks (MOs).

The program may be stored in a portable recording medium, such as a DVD or a CD-ROM, and sold for distribution. Alternatively, the program may be stored in a storage device of a server computer and transferred from the server computer to another computer via a network.

The computer stores the program recorded in a portable recording medium or transferred from the server computer in its internal storage unit; reads the program from the internal storage unit; and performs processing in accordance with the program. The computer can directly read the program from the portable recording medium and perform processing in accordance with the program. Alternatively, the computer can perform processing in accordance with the program every time the program is transferred from the server computer.

According to the present invention, by referring to information specifying the address of an instruction that causes a pipeline process forming a loop in a test program, a loop is determined based on the address of an instruction input into a pipeline and the execution status of a pipeline process forming the loop is displayed only for a predetermined number of executions of the loop. This allows the pipeline process forming the loop to be displayed in an appropriately simplified manner and increases visible comprehension. Consequently, the execution status of pipeline processing can be analyzed more easily.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A non-transitory computer-readable storage medium having stored thereon a calculation processing visualization program for visualizing execution status of pipeline processing that is executed by a calculation unit, the program causing a computer to perform a method comprising:

obtaining, from an operation-information storage unit, operation information that includes an address of an instruction that is input into a pipeline when a test program that undergoes testing is executed and information indicating execution status of a pipeline process caused by the instruction;

determining whether each pipeline process indicated by the operation information forms a loop by referring to loop-defining information stored in a loop-information storage unit, the loop-defining information specifying an address of an instruction that causes a pipeline process forming a loop, among a plurality of instructions included in the test program; and outputting visualization information indicating, in a visually comprehensible manner, execution status of a pipeline process that has been determined to form a loop and execution status of a pipeline process that has been determined to form no loop, wherein, when the instruction forming the loop is repeatedly executed two or more times, the visualization information includes status of a predetermined number of executions among a plurality of executions of the loop, and does not include status of executions other than the predetermined number of executions among the plurality of executions of the loop.

2. The storage medium according to claim 1, wherein the visualization information associates a state of each stage in the pipeline with a clock cycle.

3. The storage medium according to claim 2, wherein the visualization information indicates a state of a stage executed for a predetermined number of clock cycles or more, in a manner compressed in a direction of clock cycles.

4. The storage medium according to claim 1, wherein, when the loop is instructed to be developed after the visualization information is output, the computer outputs another visualization information indicating execution status of the pipeline process that has been determined to form the loop for all executions of the loop.

5. The storage medium according to claim 1, wherein the computer counts the number of times the loop has been executed based on a result of the determining; includes information indicating the counted number of times the loop has been executed in the visualization information; and outputs the visualization information.

6. The storage medium according to claim 1, wherein the computer calculates an average number of clock cycles required to execute one instruction during the loop based on information indicating the execution status of the pipeline process that has been determined to form the loop; includes information indicating the calculated average number of clock cycles in the visualization information; and outputs the visualization information.

7. A calculation processing visualization apparatus for visualizing execution status of pipeline processing that is executed by a calculation unit, the apparatus comprising:
  a loop-information storage unit for storing loop-defining information specifying an address of an instruction that causes a pipeline process forming a loop, among a plurality of instructions included in a test program that undergoes testing;
  an operation-information storage unit for storing operation information that includes an address of an instruction that is input into a pipeline when the test program is executed and information indicating execution status of a pipeline process caused by the instruction;
  a loop determination unit for determining whether each pipeline process indicated by the operation information stored in the operation-information storage unit forms a loop by referring to the loop-defining information stored in the loop-information storage unit; and
  an output unit for outputting visualization information indicating, in a visually comprehensible manner, execution status of a pipeline process that has been determined to form a loop by the loop determination unit and execution status of a pipeline process that has been determined to form no loop by the loop determination unit,
  wherein, when the instruction forming the loop is repeatedly executed two or more times, the visualization information includes status of a predetermined number of executions among a plurality of executions of the loop, and does not include status of executions other than the predetermined number of executions among the plurality of executions of the loop.

8. The calculation processing visualization apparatus according to claim 7, wherein the visualization information output by the output unit associates a state of each stage in the pipeline with a clock cycle.

9. The calculation processing visualization apparatus according to claim 8, wherein the visualization information output by the output unit indicates a state of a stage executed for a predetermined number of clock cycles or more, in a manner compressed in a direction of clock cycles.

10. The calculation processing visualization apparatus according to claim 7, wherein, when the loop is instructed to be developed after the visualization information is output, the output unit outputs another visualization information indicating execution status of the pipeline process that has been determined to form the loop for all executions of the loop.

11. The calculation processing visualization apparatus according to claim 7, wherein the output unit counts the number of times the loop has been executed based on the determination result of the loop determination unit; includes information indicating the counted number of times the loop has been executed in the visualization information; and outputs the visualization information.

12. The calculation processing visualization apparatus according to claim 7, wherein the output unit calculates an average number of clock cycles required to execute one instruction during the loop based on information indicating the execution status of the pipeline process that has been determined to form the loop; includes information indicating the calculated average number of clock cycles in the visualization information; and outputs the visualization information.

13. A calculation processing visualization method for visualizing execution status of pipeline processing that is executed by a calculation unit, the method comprising:
  obtaining, from an operation-information storage unit, operation information that includes an address of an instruction that is input into a pipeline when a test program that undergoes testing is executed and information indicating execution status of a pipeline process caused by the instruction;
  determining whether each pipeline process indicated by the operation information forms a loop by referring to loop-defining information stored in a loop-information storage unit, the loop-defining information specifying an address of an instruction that causes a pipeline process forming a loop, among a plurality of instructions included in the test program; and
  outputting visualization information indicating, in a visually comprehensible manner, execution status of a pipeline process that has been determined to form a loop and execution status of a pipeline process that has been determined to form no loop, wherein, when the instruction forming the loop is repeatedly executed two or more times, the visualization information includes status of a predetermined number of executions among a plurality of executions of the loop, and does not include status of executions other than the predetermined number of executions among the plurality of executions of the loop.

14. The calculation processing visualization method according to claim 13, wherein the visualization information associates a state of each stage in the pipeline with a clock cycle.

15. The calculation processing visualization method according to claim 13, wherein, when the loop is instructed to be developed after the visualization information is output, outputting another visualization information indicating execution status of the pipeline process that has been determined to form the loop for all executions of the loop.

16. The calculation processing visualization method according to claim 13, wherein, when outputting the visualization information, counting the number of times the loop has been executed based on a result of the determining and includes information indicating the counted number of times the loop has been executed in the visualization information.

17. The calculation processing visualization method according to claim 13, wherein, when outputting the visualization information, calculating an average number of clock cycles required to execute one instruction during the loop based on information indicating the execution status of the pipeline process that has been determined to form the loop and includes information indicating the calculated average number of clock cycles in the visualization information.

18. The calculation processing visualization method according to claim 14, wherein the visualization information indicates a state of a stage executed for a predetermined number of clock cycles or more, in a manner compressed in a direction of clock cycles.

* * * * *